May 24, 1960 R. E. BAUER 2,938,065
LAYER BUILT DRY BATTERY
Filed March 14, 1957
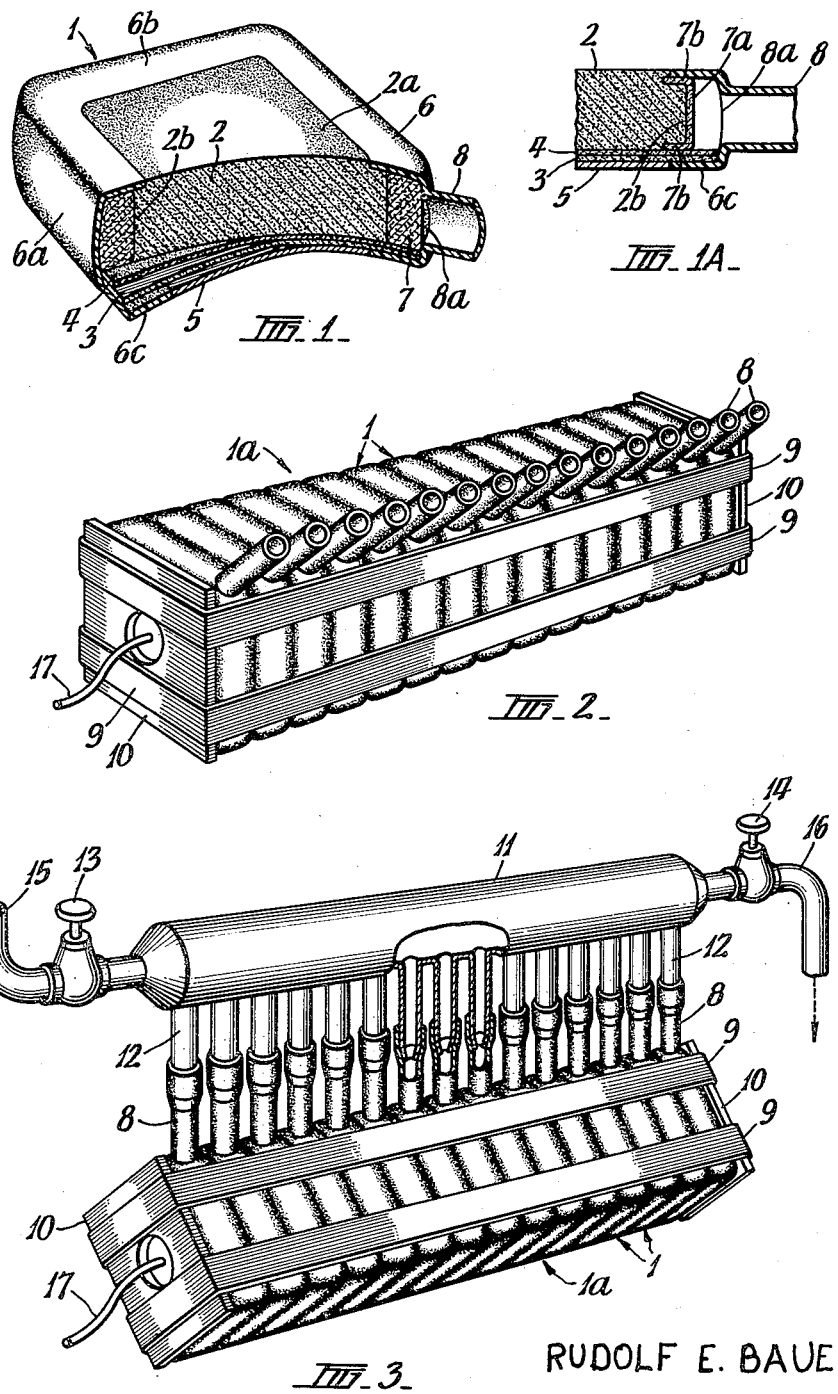
RUDOLF E. BAUER
INVENTOR
By Wenderoth, Lind & Ponack Attys

United States Patent Office 2,938,065
Patented May 24, 1960

2,938,065

LAYER BUILT DRY BATTERY

Rudolf Erich Bauer, 17 Findon St., Hawthorn, Victoria, Australia

Filed Mar. 14, 1957, Ser. No. 646,013

Claims priority, application Australia Mar. 19, 1956

4 Claims. (Cl. 136—90)

This invention relates to improvements in dry batteries and refers more particularly to the production of inert multi-cell layer built dry batteries, that is multi-cell layer built dry batteries which require to be activated by the introduction of water or electrolyte into the cells before placing in use. Batteries of this type have the advantage that they may be kept in the inert condition for long periods without appreciable deterioration, and they may be activated when required for use.

The history of the development of the Leclanché type of dry cell has unfortunately resulted in a conventional nomenclature which is somewhat misleading and which arose from the assumption that the flow of electricity was from the positive electrode of the battery to the negative electrode (via an external circuit). In fact of course, the flow of the electrons (which is now understood as the flow of electricity) is in the reverse direction. This invention is not concerned with the electrochemistry nor with the electron flow within a cell and therefore the conventional terminology will be used, even though it calls what, strictly speaking, function as the anode and cathode, the "negative" and "positive" poles of the cell (respectively). Furthermore, since this invention is not particularly concerned with the electrochemistry of the cells it is not necessary to state categorically whether the depolariser mix acts as part, or acts the part, of the cathode or not. The issue is irrelevant and is simply avoided by calling the carbon layer or rod a "positive electrode" which together with the depolariser mix (which usually includes granulated carbon) comprise the "positive pole" of the battery. The negative zinc electrode forms, and is synonymous with, the "negative pole" of the battery.

Dry cells of the conventional Leclanché type are usually constructed basically of a negative electrode in the form of a cylindrical zinc can which holds the depolariser mix and electrolyte, and in the centre of which is the positive electrode consisting of a carbon rod. The top of the can may be sealed by a layer of suitable insulating material so as to leave the top of the carbon electrode protruding.

If it is desired to render this, or a modified type of cell, inert, it is usual to dehydrate it through a hole formed in the insulating material for this purpose. Normally the cell is placed into a suitable heated chamber, the moisture being drawn off by evacuating the chamber. When the moisture has been removed the cell is taken from the chamber in a substantially inert condition.

When the cell is required to be activated use is generally made of a special activation apparatus, such as that described in my prior Australian patent specification No. 166,085. Such apparatus may consist of a chamber or tank, having means for introducing water or electrolyte thereto, and means for evacuation of the chamber. The chamber is so constructed that the cells to be activated may be placed in and removed from it. Ordinarily, water is introduced into the chamber to the required level, the cells which require activation are fully immersed in the water in the chamber. The chamber is then evacuated to a predetermined degree to remove air from the cells, and the air pressure in the chamber above the water therein is then restored so as to cause the water to enter the cells. The cells are removed and are then ready for use.

Layer built dry batteries usually consist of one or more stacks of individual cells, each cell comprising a disc of zinc (which is the negative electrode and forms the negative pole) and a depolariser mix which forms part of the positive pole and contains the electrolyte, the zinc usually being separated from the mix only by a porous paper separator. A carbon layer is formed on the outer side of the zinc disc so as to form the positive pole of the adjacent cell after assembly. The cell is encircled by a cover of insulating material which holds the cell components in place. Each cell so formed is then placed in series with others to form a stack which is pressed and strapped so as to form a solid pile to which suitable terminals are attached.

It is now proposed to construct according to the invention a layer built dry battery which is capable of being rendered inert and subsequently activated. Alternatively it is proposed to construct a layer built dry battery which is manufactured in the inert condition and need not be dehydrated but which may be activated when required for use. One problem, however, which has been met with is that it has not been found practicable to remove the required volume of water from the depolariser mix, or to introduce the required volume of electrolyte into said mix, within a reasonable period.

According to the invention I provide a layer built dry battery comprising a plurality of juxtaposed series-connected layer-type cells, each cell having: a flat electrode forming the negative pole of the cell, a separator in contact with said flat electrode, a depolariser mix in the form of a flat cake arranged in contact with the separator, said separator being between said depolariser mix and the flat electrode, said depolariser mix forming at least part of the positive pole of said cell, a nonporous ring member surrounding the said cell and forming the peripheral edge thereof, a cavity for the accommodation of electrolyte formed around the periphery of the depolariser mix of said cell between the aforesaid depolariser mix and the said ring member, a porous wick member disposed within the cavity and around the periphery of said depolariser mix, means provided in said ring member for introducing and withdrawing electrolyte from said cavity and said wick member, the said cavity being of sufficient volume to contain all the electrolyte necessary to activate said cell.

It is therefore an object of this invention to provide a layer built battery which is so constructed that each cell of said battery may be rendered inert and may be subsequently activated, in an efficient manner. The said cavity is preferably disposed completely around the perimeter of the cell, and is of sufficient volume to receive and accommodate the water or electrolyte which is introduced into the cell during activation.

More particularly, the negative pole of each cell is a flat zinc plate and the positive pole is formed partly by the depolariser mix and partly by a flat carbon electrode arranged on the zinc electrode opposite the separator of the preceding cell, when the battery is assembled. Furthermore, the ring member is preferably of U shape in cross-section and encloses the cavity and the wick, which preferably fills the cavity. A tube may be associated with each cell and communicate with the cavity so that electrolyte may be withdrawn from or supplied to the cavity via the tube. Preferably, all the tubes of one battery communicate with a common header by which they are supplied with the electrolyte or the vacuum to remove the electrolyte.

According to a modified form of the invention, the wick may not completely fill the cavity, and in such a case it may be constructed as a porous liner which is in contact with and surrounds the depolariser mix. The liner while acting as a wick also serves to keep the depolariser mix in place and to prevent it from expanding into the cavity.

The term "water" in this specification is used synonymously with aqueous electrolytes.

The cells of the layer built battery may be dehydrated as hereinafter described, or alternatively they may be constructed so as to be initially inert by forming the depolariser mix of dry materials. In the latter case, de-activation of the battery is, of course, unnecessary.

The invention may be more clearly understood by a reference to the accompanying drawings and the following description of the form of the invention illustrated therein. However, it should be understood that the following description is given by way of example only and that the invention is by no means limited to the particular embodiment of the invention therein described.

With reference to the attached drawings,

Figure 1 is a part sectional perspective view of an individual cell of a layer built battery showing the construction of said cell;

Figure 1A shows an alternative cell construction;

Figure 2 shows a number of cells assembled in a stack in which they are electrically connected in series, and Figure 3 illustrates the use of an apparatus for the dehydration or activation of the stack of cells illustrated in Figure 2.

The preferred embodiment to be described with reference to the accompanying drawings is similar in some respects to a conventional layer built dry battery. Each individual cell 1, as shown in Figure 1, forms a layer of an assembled stack 1a such as that illustrated in Figure 2. The cell 1 consists (see Figure 1) of a cake of depolariser mix and electrolyte 2, one face of which is separated from the zinc plate 3 forming the negative pole by a thin porous paper separator 4. The outer surface of the zinc plate 3 may be coated with a thin layer of carbon 5 which forms a part of the positive pole for the next adjacent cell in the stack the remainder of the positive pole being formed by the depolariser mix of the next cell.

In order to keep the above components of the cell 1, in their respective positions, and also according to the invention to provide a cavity, the cell is encircled by a ring or cover 6 of U-shaped cross-section comprising a peripheral wall 6a and integral inwardly directed flanges 6b, 6c. The inwardly directed flanges 6b are pressed into the surface of the depolariser mix 2 so that the inner edges of the flanges 6b fit into it, causing the outer surface of the flanges 6b to be flush with the said surface of the depolariser mix 2. The flange 6c is also flush with the surface of the carbon layer 5. The ring 6 is so constructed that, while holding the components of the cell in position, it also forms a cavity of predetermined size between the peripheral edge 2b of the depolariser and electrolyte mix 2, and the peripheral wall 6a of the ring 6. The cavity extends completely around the mix 2. The ring 6 may be of any suitable non-porous material such as a polyvinyl chloride plastic.

In accordance with the particular embodiment of the invention illustrated by Fig. 1, the cavity contains a porous wick 7 which provides an efficient aid to the evaporation of water from the cell during dehydration or de-activation and to the introduction of electrolyte into the depolariser mix 2 during activation, and which also assists in retaining the depolariser mix 2 in position in the cell. The wick or porous member 7 may be formed of paper, textile fibres, rubber sponge or cellular plastic of the intercommunicating type or other porous or absorbent material.

In accordance with a modification of the embodiment illustrated in Fig. 1 is an alternative cell construction illustrated in Fig. 1A. Instead of filling the cavity with a porous sponge-like wick a thin porous liner 7a surrounds the depolariser mix 2 adjacent to the surface 2b. This liner serves to contain the depolariser mix 2 and to prevent its expansion into the cavity. The liner 7a may have flanges 7b which give it greater rigidity or it may be supported or reinforced in any other suitable manner. The liner also aids evaporation and assimilation of water by the depolariser mix 2.

At any convenient position in the peripheral wall 6a of the ring 6 an aperture 8a is formed through which evaporation and activation may take place. In the illustrated embodiment, from the aperture 8a extends a tube 8 of flexible material which is inserted into and affixed to the ring 6 or is formed integrally therewith. In the drawings the tube 8 is shown connected to a corner of the cell 1, which allows stacks 1a of cells 1 to be mounted adjacent one another in the minimum of space.

When each cell 1 has been formed as above described, the required number are bound together by straps 9 and end plates 10 as shown in Figure 2. A number of stacks 1a of cells, which are now electrically connected in series, may be assembled to form a layer built battery.

When assembled in a stack or battery, each cell tube 8 may be connected to a "header" which is common to all or some of the cells of one or more stacks. Figure 3 shows a stack 1a of cells connected to a detachable header 11 for evaporation or dehydration. The tubes 8 are connected to metal tubes 12 attached to and communicating with the interior of the header 11, the ends of the tubes 8 being stretched over the ends of the tubes 12 which may be tapered to facilitate such attachment. The header 11 is provided with two valves 13 and 14 as shown. The valve 13 is placed in pipe 15 which leads to a supply of aqueous electrolyte or water. The valve 14 is placed in pipe 16 which leads to a vacuum pump.

Although it is possible to render the cells inert by using the header shown, it is seldom desirable. The cells, after assembly into stacks, may be rendered inert at the place of manufacture by placing in suitable evacuated ovens. Water vapour is drawn off from the cells and after a certain time they are rendered substantially inert. The wick is found to greatly expedite evaporation. After evaporation each cell tube 8 may be hermetically sealed, or the stack packed in an air-tight package or both.

When a stack 1a of inert cells is required to be activated it is connected in the same manner to the header 11, as described above. Valve 13 is closed and valve 14 is opened to allow the cells to be evacuated. After a suitable period, valve 14 is closed and valve 13 is opened and electrolyte is admitted to the header and the cells. If desired, electrolyte may be supplied to the cells under pressure. Having filled the wick and/or cavity with electrolyte, each cell may be permanently sealed by pinching its tube 8 with a heated clamping tool. The separate stacks may now be assembled in their final form with their terminals 17 connected ready for use. One or more of said stacks may comprise the layer built battery.

In my Australian patent specification No. 166,085 I have described an activation apparatus designed to activate inert dry cells of the Leclanché type by immersion. In using this apparatus to activate the stacks 1a of cells 1 of a layer built dry battery of the type above described, it is possible to immerse the stack in the activation chamber of the apparatus without modification to the cells or to the assembly and without the use of a header.

Alternatively, as previously indicated, a further modification of the invention is to assemble the stacks 1a in a battery and connect all cell tubes 8 to one or more headers which may be sealed at will. Each of said headers is preferably of a diameter larger than that of the cell tubes.

The invention also embraces the construction of a layer built battery having cells in which the depolariser mix or paste is initially dry, thus obviating the step of initial dehydration or de-activation. It is also to be understood that the step of evacuating the cells before hydration or activation, is a preferable but nevertheless a non-essential step. Without this step, sufficient time must be allowed to enable the cells to absorb all the necessary electrolyte before being put into use.

Also as previously mentioned, it is possible to manufacture a cell without a porous member or wick 7. In such a case, a thin porous liner 7a is provided to keep the depolariser mix 2 in position. The cavity in this case may be somewhat smaller as the volume of the water, or electrolyte to be accommodated is not augmented by that of a wick proper. In every case the volume of the cavity should be sufficient to contain enough electrolyte to saturate the mix 2, apart from the electrolyte which is immediately absorbed by the mix. If the tube 8 connected to the cell is designed to hold some electrolyte after being sealed, the volume of the actual cavity in the cell may be decreased accordingly.

I claim:

1. A layer built dry battery comprising a plurality of juxtaposed series-connected layer-type cells, each cell having a flat electrode forming the negative pole of the cell, a separator in contact with said flat electrode, a depolariser mix in the form of a flat cake arranged in contact with the separator, said separator being between said depolariser mix and the flat electrode, said depolariser mix forming at least part of the positive pole of said cell, a non-porous ring member surrounding the said cell and forming the peripheral edge thereof, said ring member defining a cavity for the accommodation of electrolyte around the periphery of the depolariser mix of said cell between the aforesaid depolariser mix and the said ring member, a porous wick member disposed within the cavity and around the periphery of said depolariser mix, and means provided in said ring member for introducing and withdrawing electrolyte from said cavity and said wick member, the said cavity being of sufficient volume to contain all the electrolyte necessary to activate said cell.

2. A layer built dry battery comprising a plurality of juxtaposed series-connected layer-type cells, each cell having a flat zinc electrode forming the negative pole of the cell, a thin porous separator covering one face of said flat electrode, a depolariser mix in the form of a flat cake arranged in contact with the separator on the side thereof opposite said zinc electrode, said depolariser mix forming part of the positive pole of said cell, a flat carbon electrode arranged on the surface of the said zinc electrode on the side thereof opposite said separator and forming part of the positive pole of the succeeding cell, the remainder of positive pole of the said cell being formed by the carbon electrode formed on the flat zinc electrode of the preceding cell, and each said layer-type cell also having a non-porous ring member surrounding the said cell and forming the peripheral edge thereof, said ring member being spaced from said flat cake to define a cavity for the accommodation of electrolyte around the periphery of the depolariser mix of said cell between the aforesaid depolariser mix and the said ring member, a porous wick member disposed within the cavity and around the periphery of said depolariser mix, and means provided in said ring member for introducing and withdrawing electrolyte from said cavity and said wick member, the said cavity being of sufficient volume to contain all the electrolyte necessary to activate said cell.

3. A layer built dry battery comprising a plurality of juxtaposed series-connected layer-type cells, each cell having a flat zinc electrode forming the negative pole of the cell, a thin porous separator covering one face of said flat electrode, a depolariser mix in the form of a flat cake arranged in contact with the separator on the side thereof opposite said zinc electrode, said depolariser mix forming part of the positive pole of said cell, a flat carbon electrode arranged on the surface of said zinc electrode on the side thereof opposite said separator and forming part of the positive pole of the succeeding cell, the remainder of positive pole of the said cell being formed by the carbon electrode formed on the flat zinc electrode of the preceding cell, and each said layer-type cell also having a non-porous ring member of U-shape cross-section peripherally surrounding said cell, said ring being spaced from said flat cake to define a cavity for the accommodation of electrolyte around the periphery of said depolariser mix of said cell between the said depolariser mix and the inner periphery of the ring member, the flanges of the ring member further enclosing the cavity, the inner edges of said flanges being in flush sealing engagement with the flat surfaces of said cell, a porous wick member disposed within said cavity so as to substantially fill said cavity, a tube for the introduction or withdrawal of electrolyte from said cavity connected to the said ring member and in communication with said cavity, the total volume of the pores within the said wick members being sufficient to contain all the electrolyte necessary to activate said cell.

4. A layer built dry battery comprising a plurality of juxtaposed series-connected layer-type cells, each cell having a flat zinc electrode forming the negative pole of the cell, a thin porous separator covering one face of said flat electrode, a depolariser mix in the form of a flat cake in contact with the separator on the side thereof opposite said zinc electrode, said depolariser mix forming part of the positive pole of said cell, a flat carbon electrode arranged on the surface of the said zinc electrode on the side thereof opposite said separator and forming part of the positive pole of the succeeding cell, the remainder of positive pole of the said cell being formed by the carbon electrode formed on the flat zinc electrode of the preceding cell and each said layer type cell also having a non-porous ring member of U-shape cross-section peripherally surrounding said cell, said ring being spaced from said flat cake to define a cavity for the accommodation of electrolyte around the periphery of said depolariser mix of said cell between the said depolariser mix and the inner periphery of the ring member, the flanges of the ring member further enclosing the cavity, the inner edges of said flanges being in flush sealing engagement with the flat surfaces of said cell, a porous wick member disposed within said cavity so as to substantially fill said cavity, a tube for the introduction or withdrawal of electrolyte from said cavity connected to the said ring member and in communication with said cavity, the total volume of the pores within the said wick member being sufficient to contain all the electrolyte necessary to activate said cell, said layer-built dry battery having a tubular header associated therewith to which the tubes from each cell of the battery are connected, and means for connecting said header to a source of vacuum for the removal of air and electrolyte from the depolariser mix of each cell and for connecting the said header to a supply of electrolyte for the activation of the cells of the said battery.

References Cited in the file of this patent

UNITED STATES PATENTS

| | | |
|---|---|---|
| 2,176,173 | Fuller et al. | Oct. 17, 1939 |
| 2,529,511 | Murphy | Nov. 14, 1950 |
| 2,684,988 | Wilburn | July 27, 1954 |
| 2,744,948 | Salauze | May 8, 1956 |

FOREIGN PATENTS

| | | |
|---|---|---|
| 66,142 | France | Jan. 30, 1956 |
| 1,126,430 | France | Nov. 22, 1956 |

OTHER REFERENCES

Vinal, G. W.: "Primary Batteries," John Wiley & Sons, New York, 1950, pages 45 and 53–56.